Patented Aug. 28, 1934

1,971,909

UNITED STATES PATENT OFFICE

1,971,909
RECOVERY OF MAGNESIUM HYDROXIDE

Harold W. Greider, Plymouth Meeting, Pa., assignor to The Philip Carey Manufacturing Company, a corporation of Ohio No Drawing. Application April 7, 1930, Serial No. 442,448

1 Claim. (Cl. 23—201)

This invention relates to products containing magnesium compounds and to the process of manufacturing basic magnesium carbonate. It is addressed to the recovery of magnesium values from highly diluted solutions of basic magnesium carbonate, and is a continuation in part of my co-pending application Serial Number 356,296 for Magnesia process and magnesium values recovery, filed April 18, 1929, which has resulted in Patent No. 1,864,063 dated June 21, 1932.

Basic magnesium carbonate has approximately the formula $3MgCO_3.Mg(OH)_2 3H_2O$. It is commonly spoken of as light magnesia, magnesia, basic magnesium carbonate, etc., and is an extensively used commercial product. Because of its lightness, bulkiness, porosity and certain other physical characteristics, it finds wide use in the manufacture of heat insulating materials.

Basic magnesium carbonate is soluble to a slight extent in water, its solubility decreasing as the temperature of the liquid is increased. Where basic magnesium carbonate is obtained by precipitation from a water solution of magnesium bicarbonate, as with heat, a proportion remains unprecipitated and dissolved in the liquid.

The usual commercial process of manufacturing magnesium carbonate consists essentially in securing a water solution of magnesium bicarbonate at a concentration and temperature at which it is relatively stable and then heating it rapidly with consequent rapid precipitation of basic magnesium carbonate formed by decomposition of the magnesium bicarbonate. The concentration of the raw magnesium bicarbonate liquor prior to heating ordinarily runs approximately from 1.65% to 2%. The temperature of the liquor usually runs approximately from 70° to 80° F., the temperatures in the winter being somewhat lower than those occurring in the summer. At higher concentrations or temperatures, magnesium bicarbonate liquor becomes too unstable to be employed practically and precipitates or crystallizes spontaneously with evolution of $CO_2$.

After raw magnesia liquor has been heated to precipitate the magnesium carbonate, the precipitate is removed by some suitable means such as sedimentation or filtration from the tailings liquor. Analysis of the tailings liquor shows that the amount of basic magnesium carbonate remaining in solution runs from .12% to .17% and that the average amount is about .15%. The above figures are substantiated both by titration tests using methyl orange as an indicator and by soap hardness tests. In addition to basic magnesium carbonate, it is not impossible that other compounds containing magnesium values may be present in the tailings liquor such as minute quantities of unconverted magnesium bicarbonate or some unstable intermediate compound.

In carrying out the magnesia process, relatively large amounts of water are used and the volume of tailings is great. Thus, for example, in the manufacture of 10,000 pounds of magnesia, the volume of tailings liquor runs approximately 60,000 gallons. Taking the concentration of the tailings as .15%, the amount of basic magnesium carbonate remaining unprecipitated and dissolved in this quantity of tailings liquor is 750 pounds. This amounts to 7.5% of the total yield.

Generally, in commercial practice, the tailings and the magnesium values contained therein are thrown away. In certain instances, tailings liquor has been returned to the process and reused. This procedure is undesirable because it is necessary to cool the tailings to about 80° F. after the magnesium carbonate has been precipitated at approximately boiling temperature, before the liquid can be reused according to the process. Cooling the large amounts of water employed in commercial practice is difficult and expensive. Another disadvantage in reusing tailings lies in the fact that the amount of impurities present tends to build up where the same liquid is used over and over again, and this tends to increase contamination in magnesia so manufactured.

It is the object of my invention to afford a practical means for recovering magnesium values from dilute solutions of basic magnesium carbonate and, more particularly, from the tailings liquor of the magnesia process above referred to.

According to my invention, dilute solutions of basic magnesium carbonate such as tailings liquor are treated with a metal hydroxide that is somewhat soluble in water such as an hydroxide of the alkali metals. Of the alkali metal hydroxides, I prefer to use sodium hydroxide. In specifying treatment with a metal hydroxide that is somewhat soluble in water, it is meant that the metal hydroxide should be at least approximately as soluble in water as the basic magnesium carbonate dissolved in the tailings liquor and should not be a metal hydroxide that is practically insoluble in water.

Where dilute solutions of basic magnesium carbonate are treated according to my invention, magnesium hydroxide is formed, which is precipitated from the solution. For example, where sodium hydroxide is used, a precipitate of magnesium hydroxide is thrown from solution. The precipitate may be recovered by suitable means. For example, it may be recovered by sedimentation whereby the precipitate is permitted to settle and the supernatant liquid drawn off or by filtration whereby the liquid containing the precipitate in suspension is filtered to collect the precipitate on the filter cloth. A combination of sedimentation and filtration may also be employed to advantage.

In commercial practice, tailings liquor may be treated according to my invention without cooling, and immediately following the separation of the magnesium carbonate after it has been precipitated with heat. In order to make the precipitation of magnesium values, according to my invention, as complete as possible, it is preferable to add a slight excess of the reagent.

I have found that from 60,000 gallons of tailings, approximately 550 pounds of magnesium hydroxide can be obtained by the addition of sodium hydroxide, according to my invention. Moreover, for each pound of sodium hydroxide, approximately 0.73 pounds of magnesium hydroxide is formed, up to the amount of sodium hydroxide required for complete precipitation of the magnesium values contained in solution.

I regard it as of great advantage that magnesium hydroxide as recovered according to my invention has valuable and distinctive properties and uses. For example, I have found that it may be used directly in the composition of heat insulation materials such as the insulation materials described in my application for new and improved heat insulating materials and compositions (Serial No. 356,297, filed April 18, 1929). When magnesium hydroxide is precipitated from a solution of basic magnesium carbonate, the resultant precipitate is very light, bulky, highly flocculated and finely divided. Magnesium hydroxide thus produced is therefore excellently adapted for use in heat insulation materials. Moreover, if the production of basic magnesium carbonate is desired from the recovered precipitate, this may be readily accomplished by saturating the precipitate in water suspension with carbon dioxide under pressure to form a magnesium bicarbonate solution and precipitating basic magnesium carbonate therefrom as in the ordinary magnesia process heretofore described. Thus, for example, precipitated magnesium hydroxide may be treated in water suspension with carbon dioxide under pressure so as to convert the magnesium hydroxide to magnesium bicarbonate and the basic magnesium carbonate precipitated and recovered in the usual way.

While I have set forth specific applications of my invention, I have endeavored to describe and desire it to be understood that my invention is applicable generally to the recovery of magnesium values from basic magnesium carbonate solution by precipitating therefrom magnesium hydroxide.

I claim:

In combination with a process of making basic magnesium carbonate wherein magnesium hydroxide in water suspension is treated with carbon dioxide to form a solution of magnesium bicarbonate, said solution of magnesium bicarbonate is heated to precipitate basic magnesium carbonate and the precipitate is separated from tailings liquor, the steps comprising incorporating in the tailings liquor sodium hydroxide to precipitate magnesium hydroxide therefrom, and separating from the excess mother liquor precipitated magnesium hydroxide.

HAROLD W. GREIDER.